US012764071B2

(12) United States Patent
Hu et al.

(10) Patent No.: US 12,764,071 B2
(45) Date of Patent: Oct. 13, 2026

(54) DATA PROCESSING METHOD AND APPARATUS, COMPUTER DEVICE, AND READABLE STORAGE MEDIUM

(71) Applicant: TENCENT TECHNOLOGY (SHENZHEN) COMPANY LIMITED, Shenzhen (CN)

(72) Inventors: Can Hu, Shenzhen (CN); Yujie Zhang, Shenzhen (CN); Lei Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 341 days.

(21) Appl. No.: 18/390,299

(22) Filed: Dec. 20, 2023

(65) Prior Publication Data

US 2024/0129251 A1 Apr. 18, 2024

Related U.S. Application Data

(63) Continuation of application No. PCT/CN2023/071183, filed on Jan. 9, 2023.

(30) Foreign Application Priority Data

Feb. 25, 2022 (CN) ......................... 202210180680.4

(51) Int. Cl.
*H04L 47/31* (2022.01)
*H04L 47/62* (2022.01)

(52) U.S. Cl.
CPC .............. *H04L 47/31* (2013.01); *H04L 47/62* (2013.01)

(58) Field of Classification Search
None
See application file for complete search history.

(56) References Cited

U.S. PATENT DOCUMENTS 9,712,427 B1 * 7/2017 Pittman .................... G06F 3/067
11,159,456 B2 * 10/2021 Yamamoto .............. H04L 49/90
(Continued)

FOREIGN PATENT DOCUMENTS

CN 106878966 A 6/2017
CN 110493116 A 11/2019
(Continued)

OTHER PUBLICATIONS

The European Patent Office (EPO) Office Action for Application No. 23758901.5 Mar. 5, 2025 8 Pages.
(Continued)

*Primary Examiner* — Gregory B Sefcheck
*Assistant Examiner* — Benjamin Peter Welte
(74) *Attorney, Agent, or Firm* — Anova Law Group, PLLC

(57) ABSTRACT

Embodiments of this application provide a data processing method and apparatus, a computer device, and a readable storage medium. The method may be applied to an in-vehicle central control device, and includes polling data packets in the database, to obtain a to-be-added data packet set, and adding the to-be-added data packet set to the cache queue; polling the cache queue, to obtain a to-be-uploaded data packet set, and uploading the to-be-uploaded data packet set through a wireless communication connection of the in-vehicle central control device; storing a first data packet in the database in response to the first data packet in the to-be-uploaded data packet set meeting a continuous uploading failure condition; and deleting a second data packet from the database, in response to the second data packet in the to-be-uploaded data packet set being successfully uploaded to a server.

19 Claims, 7 Drawing Sheets

(56) References Cited

U.S. PATENT DOCUMENTS

| | | | | |
|---|---|---|---|---|
| 2007/0201362 | A1* | 8/2007 | Johnson | H04L 41/0803 370/452 |
| 2008/0154099 | A1* | 6/2008 | Aspel | A61B 5/002 705/2 |
| 2017/0054573 | A1* | 2/2017 | Herrero | H04L 67/1023 |
| 2017/0085340 | A1* | 3/2017 | Park | B60R 21/00 |
| 2017/0303159 | A1* | 10/2017 | Ma | H04L 1/0001 |
| 2019/0164645 | A1* | 5/2019 | Otsuki | G16H 40/67 |
| 2019/0332608 | A1* | 10/2019 | Qiu | H04L 9/3239 |

FOREIGN PATENT DOCUMENTS

| | | | |
|---|---|---|---|
| CN | 110764936 | A | 2/2020 |
| CN | 111694766 | A | 9/2020 |
| CN | 113965482 | A | 1/2022 |
| CN | 114567674 | A | 5/2022 |
| JP | 2009284085 | A | 12/2009 |
| WO | 2021082858 | A1 | 5/2021 |
| WO | 2023160276 | A1 | 8/2023 |

OTHER PUBLICATIONS

The World Intellectual Property Organization (WIPO) International Search Report for PCT/CN2023/071183 Jun. 2, 2023 6 Pages (including translation).

* cited by examiner

DATA PROCESSING METHOD AND APPARATUS, COMPUTER DEVICE, AND READABLE STORAGE MEDIUM

RELATED APPLICATIONS

This application is a continuation of PCT Application No. PCT/CN2023/071183, filed on Jan. 9, 2023, which in turn claims priority to Chinese Patent Application No. 202210180680.4, filed with the China National Intellectual Property Administration Feb. 25, 2022, and entitled "DATA PROCESSING METHOD AND APPARATUS, COMPUTER DEVICE, AND READABLE STORAGE MEDIUM." The two applications are incorporated herein by reference in their entirety.

FIELD OF THE TECHNOLOGY

This application relates to the field of computer technologies, and in particular, to a data processing method and apparatus, a computer device, and a readable storage medium.

BACKGROUND OF THE DISCLOSURE

Different from a mobile phone, a personal computer, and the like, communication between an in-vehicle central control system and the outside world is limited by a network environment, a memory, a disk space, and a processing capability, and there is often a lack of access to enough information to deal with functional abnormalities.

SUMMARY

Embodiments of this application provide a data processing method and apparatus, a computer device, and a readable storage medium, to improve utilization of network resources, and increase a success rate of uploading data packets.

An embodiment of this application provides a data processing method, applied to an in-vehicle central control device, a database and a cache queue being arranged in the in-vehicle central control device, and the method including polling data packets in the database, to obtain a to-be-added data packet set, and adding the to-be-added data packet set to the cache queue; polling the cache queue, to obtain a to-be-uploaded data packet set, and uploading the to-be-uploaded data packet set through a wireless communication connection of the in-vehicle central control device; storing a first data packet in the database in response to that the first data packet in the to-be-uploaded data packet set meets a continuous uploading failure condition; and deleting the second data packet from a database, in response to the second data packet in the to-be-uploaded data packet set being successfully uploaded to a server.

An embodiment of this application provides a data processing apparatus, including a database polling module, configured to poll data packets in the database, to obtain a to-be-added data packet set, and add the to-be-added data packet set to the cache queue; a queue polling module, configured to poll the cache queue, to obtain a to-be-uploaded data packet set, and upload the to-be-uploaded data packet set through a wireless communication connection of the in-vehicle central control device; a data adding module, configured to add a first data packet to the database in response to that the first data packet in the to-be-uploaded data packet set meets a continuous uploading failure condition; and a data deleting module, configured to delete a second data packet from the database in response to the second data packet in the to-be-uploaded data packet set being successfully uploaded to a server.

An embodiment of this application provides a computer device, including: at least one processor and at least one memory, where the at least one processor is connected to the memory, the at least one memory is configured to store a computer program; and when the computer program is executed by the at least one processor, the computer device executes the method provided in this embodiment of this application.

An embodiment of this application provides a non-transitory computer-readable storage medium, storing a computer program, the computer program being applicable to be loaded and executed by a processor, to enable a computer device having the processor to perform the method provided in this embodiment.

In embodiments of this application, the computer device may poll data packets in the database, to obtain a to-be-added data packet set, add the to-be-added data packet set to the cache queue, then poll the cache queue, to obtain a to-be-uploaded data packet set, and upload the to-be-uploaded data packet set. The computer device may add, in response to that a first data packet in the to-be-uploaded data packet set meets a continuous uploading failure condition, the first data packet to the database; and the computer device may delete, in response to a second data packet in the to-be-uploaded data packet set being successfully uploaded to a server, and the second data packet existing in the database, the second data packet from the database. In embodiments consistent with the present disclosure, by storing a to-be-uploaded data packet in the cache queue, the to-be-uploaded data packet in the to-be-uploaded data packet set may be directly read from the memory, to avoid reading data packets from a disk, thereby improving efficiency of uploading data packets. In addition, when uploading the data packets in the to-be-uploaded data packet set, uploading of the first data packet may be suspended in response to the first data packet in the to-be-uploaded data packet set meeting the continuous uploading failure condition, and the first data packet is then stored in the database, to avoid network resources from being repeatedly occupied when a network environment is not good. This may improve utilization of the network resources. When the network environment is subsequently improved, by re-performing polling on the database, there is still a chance to successfully upload the first data packet, thereby improving the success rate of uploading the data packets.

BRIEF DESCRIPTION OF THE DRAWINGS

To describe the technical solutions of embodiments of this application or the related art more clearly, the following briefly introduces the accompanying drawings required for describing the embodiments or the related art. The accompanying drawings in the following description show merely some embodiments of this application.

DESCRIPTION OF EMBODIMENTS

The technical solutions in embodiments of this application are clearly and completely described below with reference to the accompanying drawings in the embodiments of this application. Apparently, the described embodiments are merely some rather than all of the embodiments of this application. All other embodiments obtained by a person of ordinary skill in the art based on the embodiments of this application without making creative efforts shall fall within the protection scope of this application.

A software development kit (SDK) refers to a set of development tools for building application software for a specific software package, a software framework, a hardware platform, an operating system, and the like. An application programming interface (API) refers to some predefined interfaces or functions in the SDK, or refers to an agreement between different components of a software system, which are configured to provide an application and a developer with a set of routines that may be accessed based on specific software or hardware without having to access a source code or understand details of an internal operating mechanism.

Figure 1:
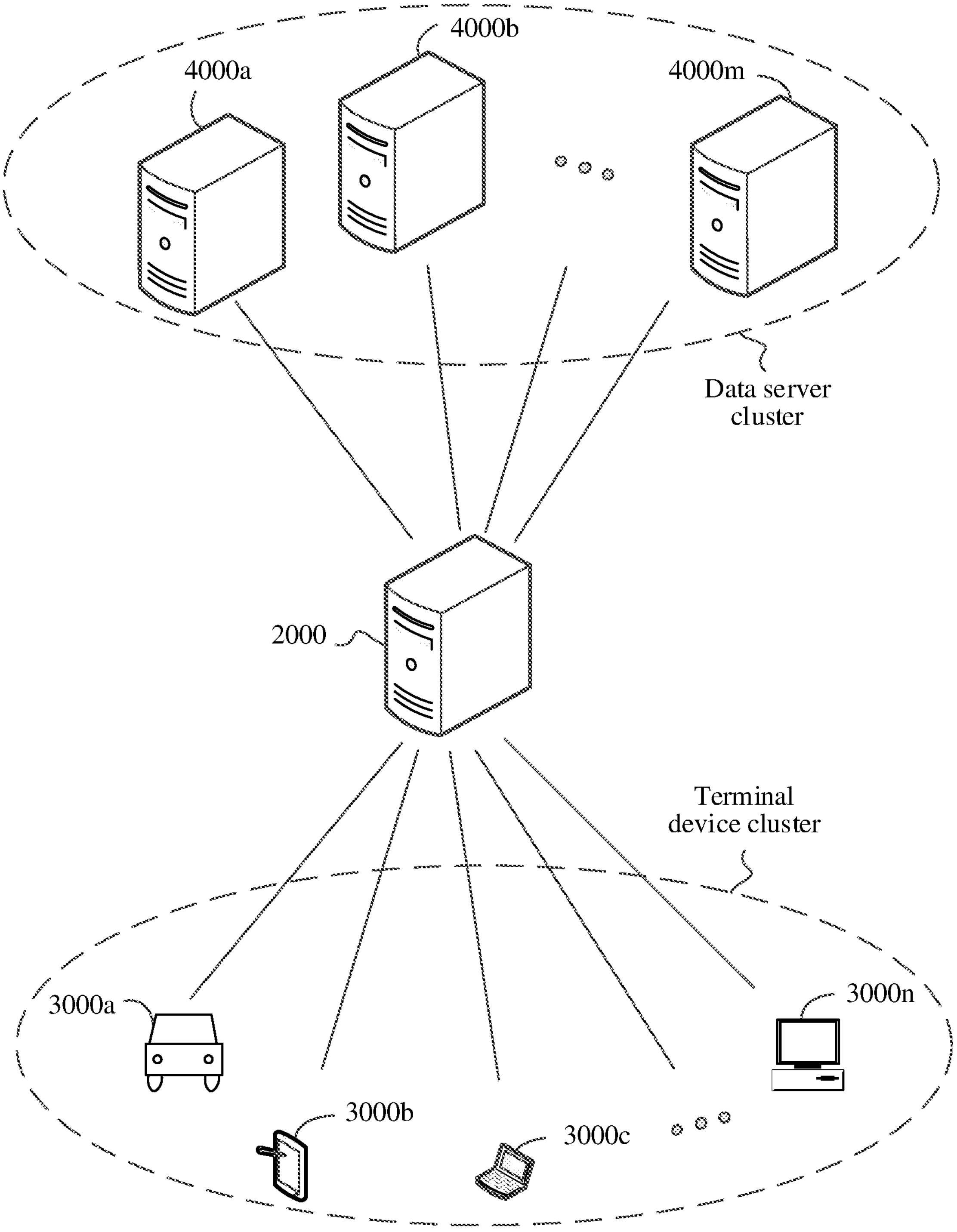
FIG. 1 is a schematic diagram of a structure of a network architecture according to an embodiment of this application.

FIG. 1 is a schematic diagram of a structure of a network architecture according to an embodiment of this application. As shown in FIG. 1, the network architecture may include an access server 2000, a data server cluster, and a terminal device cluster. The terminal device cluster may specifically include one or more terminal devices, and a quantity of terminal devices in the terminal device cluster is not limited herein. As shown in FIG. 1, a plurality of terminal devices may specifically include a terminal device 3000*a*, a terminal device 3000*b*, a terminal device 3000*c*, . . . , and a terminal device 3000*n*; and the terminal device 3000*a*, the terminal device 3000*b*, the terminal device 3000*c*, . . . , and the terminal device 3000*n* may be directly or indirectly connected to the access server 2000 in a wired or wireless communication manner, so that each terminal device may perform data exchange with the access server 2000 through the network connection.

Each terminal device in the terminal device cluster may include: smart terminals with data processing functions such as a smartphone, a tablet computer, a notebook computer, a desktop computer, a smart home appliance, a wearable device, an in-vehicle terminal (such as an in-vehicle central control device), a workshop testing terminal, and the like. It is to be understood that each terminal device in the terminal device cluster as shown in FIG. 1 may be integrated with an application client. When running in each terminal device, the application client may perform data exchange with the access server 2000 shown in FIG. 1. The application client may be an independent client, or an embedded sub-client integrated in a client, which is not limited in this application.

Specifically, the application client may include clients with data processing functions such as a browser, an in-vehicle client, a smart home client, an entertainment client, a multimedia client (for example, a video client), a social client, an information client, and the like. It is to be understood that the in-vehicle terminal may be a smart terminal in a smart traffic scenario. The application client on the in-vehicle terminal may be the in-vehicle client. An operating system (OS) in the in-vehicle terminal may be an in-vehicle Linux OS or an in-vehicle Android OS. The in-vehicle Linux OS is a Linux operating system that runs on a vehicle, and the in-vehicle Android OS is an Android operating system that runs on the vehicle.

The access server 2000 may be an independent physical server, may also be a server cluster or distributed system composed of a plurality of physical servers, and may also be a cloud server providing basic cloud computing services, such as a cloud service, a cloud database, cloud computing, a cloud function, cloud storage, a network service, cloud communication, a middleware service, a domain name service, a security service, a CDN, and a big data and AI platform.

The data server cluster may include one or more data servers, and a quantity of data servers in the data server cluster is not limited herein. As shown in FIG. 1, a plurality of data servers may specifically include a data server 4000*a*, a data server 4000*b*, . . . , and a data server 4000*m*. The data server 4000*a*, the data server 4000*b*, . . . , and the data server 4000*m* may respectively perform direct or indirect network connection with the access server 2000 in a wired or wireless communication manner, so that each data server may perform data exchange with the access server 2000 through the network connection.

The data server in the data server cluster shown in FIG. 1 may be an independent physical server, may also be a server cluster or distributed system composed of a plurality of physical servers, and may also be a cloud server providing basic cloud computing services, such as a cloud service, a cloud database, cloud computing, a cloud function, cloud storage, a network service, cloud communication, a middleware service, a domain name service, a security service, a CDN, and a big data and AI platform.

This application may provide information support for an intelligent traffic system by uploading a data packet associated with the vehicle to the intelligent traffic system, to implement services such as traffic transportation and automatic driving. The intelligent traffic system (ITS), also referred to as an intelligent transportation system, effectively and comprehensively applies advanced science and technology (an information technology, a computer technology, a data communication technology, a sensor technology, an electronic control technology, an automatic control theory, operations research, artificial intelligence, and the like) to traffic transportation, service control, and vehicle manufacturing, to strengthen a connection between a vehicle, a road, and a user, thereby forming a comprehensive transportation system that ensures safety, improves efficiency, improves the environment, and saves energy.

The terminal device (also referred to as a target terminal device) described in this embodiment may be one terminal device selected from a plurality of terminal devices shown in FIG. 1. For example, in this embodiment, the in-vehicle terminal device 3000*a* shown in FIG. 1 may be used as the terminal device described in this embodiment. The terminal device may be integrated with an application client with a data processing function. In this case, the terminal device may perform data exchange with the access server 2000 through the application client.

The terminal device may be a terminal device that needs to upload a data packet. The terminal device may upload the data packet to the access server 2000, so that the access server 2000 distributes different data packets to different data servers. For ease of understanding, the data server (also referred to as a target data server) described in this embodiment may be one data server selected from the plurality of data servers described in FIG. 1. For example, the data server described in this embodiment may be the data server 4000*a* described in FIG. 1. The data server may receive the data packet uploaded by the terminal device through the access server 2000.

A quantity of application clients in the terminal device may be one or more, and one or more terminal devices may be connected to one access server 2000. Through the access server, the terminal device may forward data packets to different data servers without adapting the terminal device according to a requirement of the data server. A new data server is accessed on the premise of avoiding updating the terminal device, to meet requirements of different terminal devices and different application clients for the data server.

The access server 2000 may distribute a plurality of data packets corresponding to one application client to different data servers. For example, the access server 2000 may forward a data packet B11 to a data server F11, and forward a data packet B12 to a data server F12. The data packet B11 and the data packet B12 may be data packets corresponding to the same application client. In some embodiments, the access server 2000 may also distribute data packets corresponding to a plurality of application clients respectively to different data servers. For example, the access server 2000 may forward a data packet B21 to a data server F21, and the access server 2000 may forward a data packet B22 to a data server F22. The data packet B21 and the data packet B22 may be data packets corresponding to different application clients. In some embodiments, the access server 2000 may further respectively distribute data packets corresponding to a plurality of terminal devices to different data servers. For example, the access server 2000 may forward a data packet B31 to a data server F31, and forward a data packet B32 to a data server F32. The data packet B31 and the data packet B32 may be data packets corresponding to different terminal devices.

This embodiment of this application provides a data reporting solution for an application client in a terminal device. The data reporting solution may provide a cache mechanism. Data packets may be stored in a database and a cache queue that are involved in the cache mechanism. By performing polling on the data packets in the database, a to-be-added data packet set may be obtained. By performing polling on the data packets in the cache queue, a to-be-uploaded data packet set may be obtained. Therefore, through a joint action of the database and the cache queue, uploading processing of the data packets in the to-be-uploaded data packet set may be implemented, to be specific, the data packets are uploaded to the access server 2000, so that the access server 2000 distributes the data packets to the data server. Accordingly, regardless of whether the data packets in the to-be-uploaded data packet set are successfully uploaded or the data packets in the to-be-uploaded data packet set fail to be uploaded, this embodiment has a complete processing flow.

For ease of understanding, in this embodiment, data uploaded by the application client may be collectively referred to as service data, and in this embodiment, data obtained after packing processing is performed on the service data may be collectively referred to as data packets.

Figure 2:
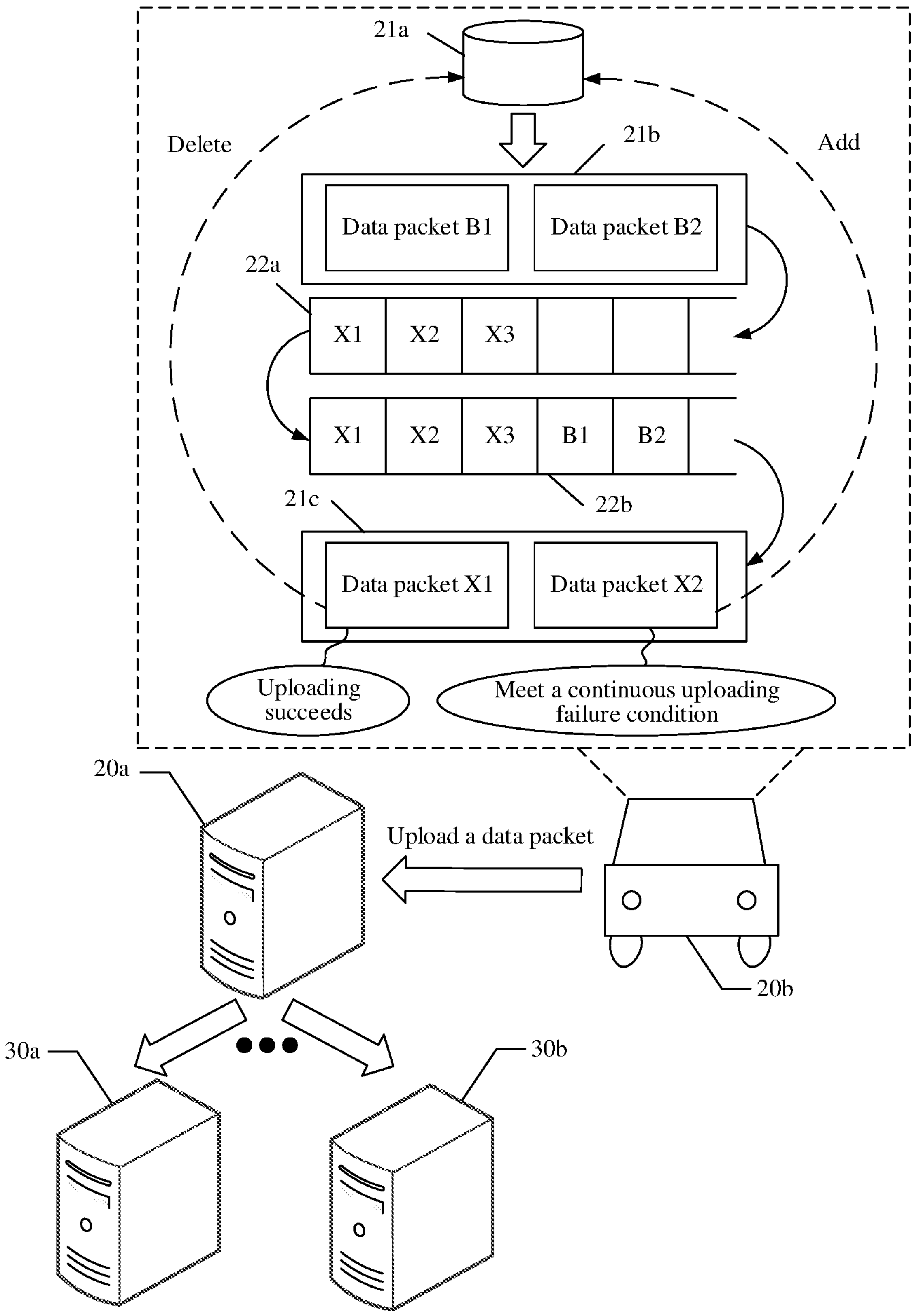
FIG. 2 is a schematic diagram of a scenario for data exchange according to an embodiment of this application.

FIG. 2 is a schematic diagram of a scenario for data exchange according to an embodiment of this application. As shown in FIG. 2, server 20*a* may be an access server 2000 in the embodiment corresponding to FIG. 1. A terminal device 20*b* may be any terminal device in a terminal device cluster in the embodiment corresponding to FIG. 1. A server 30*a* and a server 30*b* may respectively be any data server in a data server cluster in the embodiment corresponding to FIG. 1. For ease of understanding, in this embodiment, an example in which the terminal device 3000*a* shown in FIG. 1 is used as the terminal device 20*b*, the data server 4000*a* shown in FIG. 1 is used as the server 30*a*, and the data server 4000*b* shown in FIG. 1 is used as the server 30*b* is used. A specific process of performing data exchange among server 20*a*, the terminal device 20*b*, the server 30*a*, and the server 30*b* shown in FIG. 2 is described.

As shown in FIG. 2, the terminal device 20*b* may include a database 21*a* and a cache queue 22*a*. The same or different data packets may be stored in database 21*a* and the cache queue 22*a*. A quantity of data packets in the database 21*a* and a quantity of data packets in the cache queue 22*a* are not limited in this embodiment. The capacity of the database 21*a* and the capacity of the cache queue 22*a* are not limited in an implementation of this application. For ease of understanding, by using the database 21*a* including a data packet X1, a data packet B1, and a data packet B2 as an example, description is provided by using a cache queue 22*a* including a data packet X1, a data packet X2, and a data packet X3 as an example. The description is provided by using an example in which there are six capacities of the cache queue 22*a*.

As shown in FIG. 2, the terminal device 20*b* may respectively poll the database 21*a* and the cache queue 22*a*. Polling periodicities corresponding to database 21*a* and the cache queue 22*a* respectively may be the same or different. Periodicity duration of the polling periodicities corresponding to the database 21*a* and the cache queue 22*a* respectively is not limited in this embodiment. Polling may indicate that the terminal device regularly sends an inquiry to the database or the cache queue, inquiries whether the database or the cache queue needs a service of the terminal device, and provides the service as soon as the service is available. Then, the process is continuously repeated. The service may indicate that the terminal device reads a specific quantity of data packets from the database or the cache queue according to a specific regulation, and then uses the read data packets as a result of polling. A result of polling corresponding to the database may be a to-be-added data packet set, and a result of polling corresponding to the cache queue may be a to-be-uploaded data packet set.

When the polling periodicities corresponding to the database 21*a* and the cache queue 22*a* respectively are the same, the terminal device 20*b* may first poll the database 21*a*, and then poll the cache queue 22*a*. The terminal device 20*b* may also first poll the cache queue 22*a*, and then poll the database 21*a*. The terminal device 20*b* may further simultaneously poll the database 21*a* and the cache queue 22*a*. When the polling periodicities corresponding to the database 21*a* and the cache queue 22*a* respectively are different, the terminal device 20*b* may poll the database 21*a* according to the polling periodicity corresponding to the database 21*a*, and poll the cache queue 22*a* according to the polling periodicity corresponding to the cache queue 22*a*. Polling database 21*a* and polling performed on the cache queue 22*a* do not interfere with each other. In this embodiment, an example in which the terminal device 20*b* first performs polling on the database 21*a* and then performs polling on the cache queue 22*a* is used for description.

As shown in FIG. 2, the terminal device 20*b* may poll the database 21*a* to obtain the to-be-added data packet set 21*b*, and add the to-be-added data packet set 21*b* to the cache queue 22*a*. A quantity of data packets in the to-be-added data packet set 21*b* is not limited in this embodiment. The quantity of data packets in the to-be-added data packet set 21*b* may be a positive integer that is less than or equal to a quantity of idle positions (namely, a capacity of the cache queue 22*a* minus a quantity of packets of data packets in the cache queue 22*a*) in the cache queue 22*a* and less than or equal to a quantity of data packets in the database 21*a*. A description is provided by using an example in which a quantity of data packets in the to-be-added data packet set 21*b* is two, and the two data packets may specifically include a data packet B1 and a data packet B2.

The terminal device 20*b* may use cache queue 22*a* to which the data packet B1 and the data packet B2 are added as the cache queue 22*b*. In other words, the cache queue 22*b* may include a data packet X1, a data packet X2, a data packet X3, a data packet B1, and a data packet B2, then poll the cache queue 22*b* to obtain a to-be-uploaded data packet set 21*c*, and upload the to-be-uploaded data packet set 21*c*. A quantity of data packets in the to-be-uploaded data packet set 21*c* is not limited in this embodiment. The data packets in the to-be-uploaded data packet set 21*c* may be a positive integer less than or equal to a quantity of data packets in cache queue 22*b*. A description is provided by using an example in which a quantity of data packets in the to-be-uploaded data packet set 21*c* is two, and the two data packets may specifically include a data packet X1 and a data packet X2.

The terminal device 20*b* may use the cache queue 22*b* that is obtained by performing polling on the data packet X1 and the data packet X2 as the cache queue 22*c* (not shown in the figure). In other words, the cache queue 22*c* may include a data packet X3, a data packet B1, and a data packet B2.

As shown in FIG. 2, in a process of uploading data packet X1 and the data packet X2 in the to-be-uploaded data packet set 21*c*, it is assumed that the data packet X2 meets a continuous uploading failure condition, and the data packet X1 is successfully uploaded, the terminal device 20*b* may add the data packet X2 to the database 21*a* in response to determining that the data packet X2 meets the continuous uploading failure condition, to re-read the data packet X2 in the database 21*a* into the cache queue in a subsequent step, thereby implementing uploading processing on the data packet X2; and the terminal device 20*b* may upload the data packet X1 to the server 20*a* in response to determining that the data packet X1 is successfully uploaded, so that the server 20*a* distributes the data packet X1 to different data servers. For example, server 20*a* may distribute the data packet X1 to the server 30*a*. In addition, terminal device 20*b* may determine whether the data packet X1 exists in the database 21*a*, and delete the data packet X1 from the database 21*a* in response to the data packet X1 existing in the database 21*a*. In this case, database 21*a* may include the data packet X2, the data packet B1, and the data packet B2.

The terminal device 20*b* may respectively poll the database 21*a* and the cache queue 22*c* again. There is a fixed time interval (which may also be referred to as polling periodicity duration) between this polling and the previous polling. Duration of the time interval is not limited in this embodiment. For example, the time interval may be five seconds. The terminal device 20*b* may poll the database 21*a* to obtain the new to-be-added data packet set, and add the new to-be-added data packet set to the cache queue 22*c*. The new to-be-added data packet set may include the data packet X2, and the cache queue 22*c* (may be referred to as the latest cache queue (not shown in the figure)) to which the data packet X2 is added may include the data packet X3, the data packet B1, the data packet B2, and the data packet X2. The terminal device 20*b* may poll the latest cache queue to obtain a new to-be-uploaded data packet set. The new to-be-uploaded data packet set may include the data packet X3 and the data packet B1, and in this case, the new to-be-uploaded data packet set may be removed from the latest cache queue.

Accordingly, when uploading the data packet X3, the terminal device 20*b* may upload the data packet X3 to the access server 20*a* in response to the data packet X3 being successfully uploaded, so that the access server 20*a* distributes the data packet X3 to different data servers. For example, the access server 20*a* may distribute the data packet X3 to the data server 30*b*. In addition, terminal device 20*b* may determine whether the data packet X3 exists in the database 21*a*. In response to the data packet X3 not existing in database 21*a*, the terminal device 20*b* does not need to perform other operations.

This embodiment may provide a cache mechanism. The cache mechanism may store a to-be-uploaded data packet (namely, the data packet in the to-be-uploaded data packet set) by using the cache queue, and then when uploading processing is performed on the data packet in the to-be-uploaded data packet set, different responses may be made in response to a case that uploading succeeds or uploading fails. For a data packet that is successfully uploaded, when the data packet that is successfully uploaded exists in the database, the data packet that is successfully uploaded may be deleted from the database; and for a data packet that fails to be uploaded, the data packet that fails to be uploaded may be added to the database. Therefore, the different responses made by the terminal device to the data packet that is successfully uploaded and the data packet that fails to be uploaded may improve efficiency of uploading the data packet while ensuring a success rate of uploading the data packet.

Figure 3:
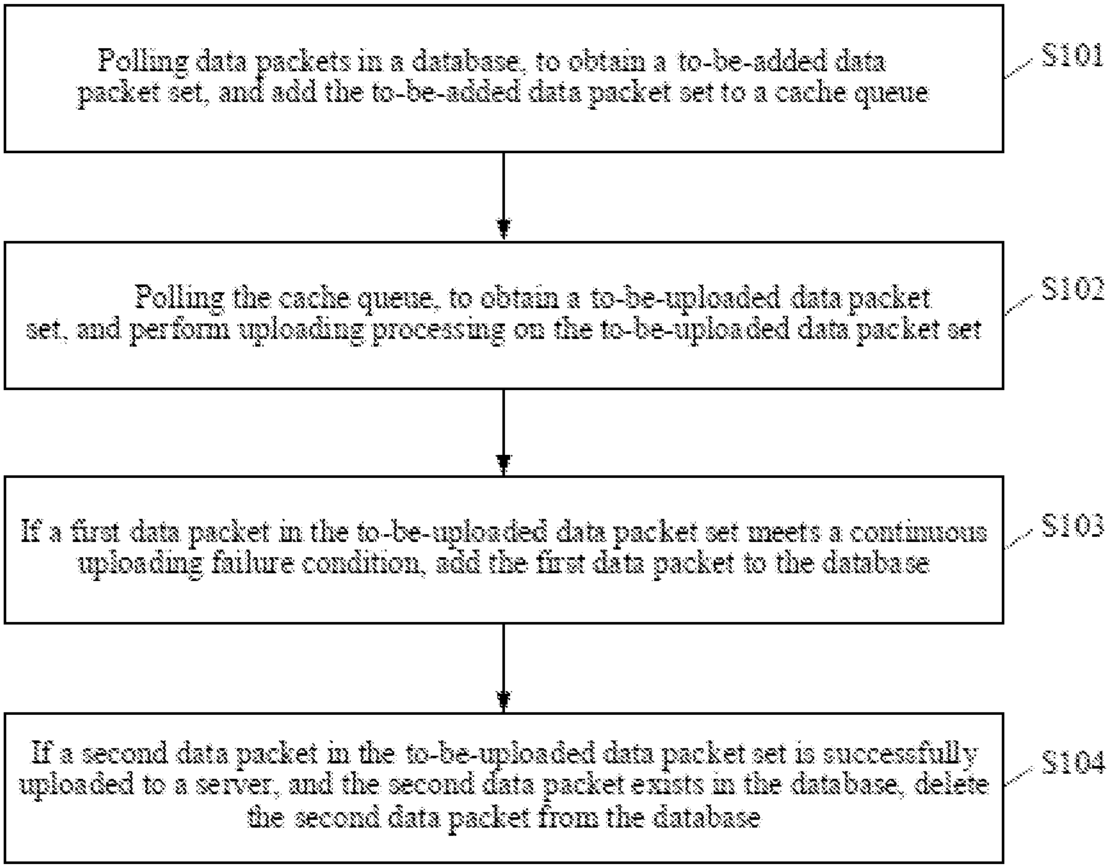
FIG. 3 is a schematic flowchart of a data processing method according to an embodiment of this application.

FIG. 3 is a schematic flowchart of a data processing method according to an embodiment of this application. The method may be performed by the server, or may be performed by the terminal device, or may be jointly performed by the server and the terminal device. The server may be server 20*a* in an implementation corresponding to FIG. 2, and the terminal device may be a terminal device 20*b* in an implementation corresponding to FIG. 2. In this embodiment, the method performed by the terminal device is used as an example for description. In this embodiment, the terminal device may be an in-vehicle central control device. A database and a cache queue are set in the in-vehicle central control device. The database may be set in a disk (such as a hard disk) of the in-vehicle central control device, and the cache queue may be set in a memory of the in-vehicle central control device. The data processing method may include step S101 to step S104.

Step S101: Perform polling on data packets in a database, to obtain a to-be-added data packet set, and add the to-be-added data packet set to a cache queue.

A terminal device may invoke, in response to an idle position existing in the cache queue, a database thread through a reporting component to poll the data packets in the database, to obtain the to-be-added data packet set. The terminal device may send the to-be-added data packet set to the reporting component through the database thread, and add the to-be-added data packet set to the cache queue through the reporting component.

The reporting component (namely, reporting SDK) may further include a reporting thread. The terminal device may send the to-be-added data packet set to the reporting thread through the database thread, and add the to-be-added data packet set to the cache queue through the reporting thread. It is to be understood that both the reporting thread and the database thread are components of the reporting component. The reporting thread may be configured to store data packets to the cache queue, read the data packets from the cache queue, and the like. The database thread may be configured to store the data packets to the database, read the data packets from the database, and the like. The uploading processing of the data packets is implemented through an inter-thread communication mechanism, which may improve efficiency of uploading the data packets without affecting operating performance of the system.

The terminal device may invoke, in response to the idle position existing in the cache queue, the database thread through the reporting component, and in the database thread, sort the data packets in the database according to a warehousing timestamp (namely, a first warehousing timestamp) of the data packets in the database, to obtain the sorted data packets. The terminal device may poll the sorted data packets, to obtain K data packets, and determine the K data packets as the to-be-added data packet set. K may be a positive integer.

The first warehousing timestamp may represent a timestamp (for example, a T1 moment) when the data packets in the database are written into the database, or may also represent a modified timestamp (for example, a T2 moment) of an original timestamp (such as a T1 moment) of the data packets in the database. The T1 moment may be a previous moment of the T2 moment and before the T2 moment. For the modified timestamp of the original timestamp, refer to a moment at which the data packet meets a continuous uploading failure condition (for the continuous uploading failure condition, refer to the description of step S202 and step S203 below). In other words, the timestamp at which the data packet was originally written into the database is updated based on the moment at which the continuous uploading failure condition is met.

K may be a positive integer less than or equal to a quantity of idle positions in the cache queue. K may be a positive integer less than or equal to a quantity of data packets in the database. Generally, K is a fixed value (for example, K is equal to 10). When the quantity of idle positions in the cache queue is greater than K and the quantity of data packets in the database is greater than K, the terminal device may poll the database to obtain K data packets. When the quantity of idle positions in the cache queue is equal to (K−1) and the quantity of data packets in the database is greater than K, the terminal device may poll the database to obtain (K−1) data packets. When the quantity of idle positions in the cache queue is greater than K and the quantity of data packets in the database is equal to (K−1), the terminal device may poll the database to obtain (K−1) data packets.

In some embodiments, when the data packet does not exist in the database, to be specific, when the database is empty, the terminal device does not need to perform a step of performing polling on the data packets in the database. Accordingly, the to-be-added data packet set cannot be obtained, and a step of adding the to-be-added data packet set to the cache queue does not need to be performed. In this case, K is equal to 0.

Step S102: Perform polling on the cache queue, to obtain a to-be-uploaded data packet set, and upload the to-be-uploaded data packet set.

In step S102, polling may be performed on the cache queue, to obtain the to-be-uploaded data packet set, and uploading is performed on the to-be-uploaded data packet set through a wireless communication connection of the in-vehicle central control device.

The terminal device may perform, in response to data packets existing in the cache queue and according to queue positions of the data packets in the cache queue, polling on the cache queue, to obtain S data packets in a reporting component, and determine the S data packets as the to-be-uploaded data packet set. S may be a positive integer. The terminal device may perform uploading process on the to-be-uploaded data packet set based on the network component (namely, network SDK).

According to a first-in-first-out principle of the queue (for example, the cache queue), S data packets obtained by the terminal device by performing polling on the cache queue may be the first S data packets in the cache queue. In other words, the S data packets obtained by performing polling are at a front queue position in the cache queue. The front queue position indicates that the data packets first enter the cache queue. In this case, the data packets that first enter the cache queue first may be reported, which ensures fairness of reporting between the data packets and may also reduce a case of a delay in reporting long-standing data packets.

Figure 4:
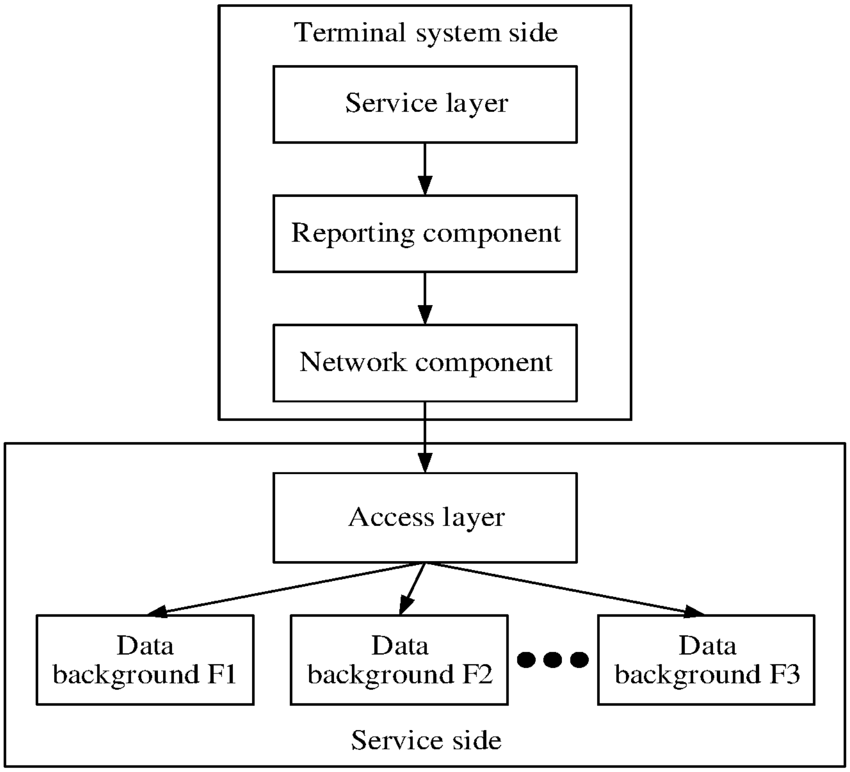
FIG. 4 is a schematic flowchart of data exchange according to an embodiment of this application.

FIG. 4 is a schematic flowchart of data exchange according to an embodiment of this application. An overall exchange process shown in FIG. 4 may include a terminal system side and a server, the terminal system side may include a service layer, a reporting component, and a network component, and the server may include an access layer and a plurality of data backgrounds. The reporting component may have different reporting policies, and the network component may have different network knowledge.

The reporting component is a component used in a terminal device to upload data of the service layer to the server.

In some embodiments, the reporting component may be a component of an operating system in the terminal device. The service layer includes an application, such as an application that is installed and run in the operating system.

In some embodiments, the reporting component may be a component of one software platform running in the operating system of the terminal device. The service layer includes an application, such as an application and a mini program (a lightweight application that may be used without being installed) that run in the software platform. The reporting component provides various APIs for the application and the mini program to invoke, thereby triggering the reporting component to perform a corresponding function of each API.

As shown in FIG. 4, the application client may be used as the service layer. After being connected to the reporting component, the service layer may report the data packet by using the API, and the reporting component may store the data packet in the database or the cache queue. A network layer may read the data packet from the database or the cache queue, and upload the data packet to an access layer of a service side through the API provided by an internal network module. The access layer may forward the data packet to different data backgrounds.

The access layer may be an access server, and the data background may be a data server. In other words, a terminal system may upload the data packet to the access server through a network component, so that the access server may distribute the data packet to different data servers. Accordingly, the data packet may be forwarded to any data server without modifying the application client. A quantity of data servers is not limited in this embodiment. An example in which the data server includes a data background F1, a data background F2, and a data background F3 is used for description.

In some embodiments, when the data packet does not exist in the cache queue, to be specific, when the cache queue is empty, the terminal device does not need to perform a step of performing polling on the data packets in the cache queue. Accordingly, the to-be-uploaded data packet set cannot be obtained, and a step of uploading the to-be-uploaded data packet does not need to be performed. In this case, S is equal to 0.

S may be a positive integer less than or equal to a quantity of data packets in the cache queue. Generally, S is a fixed value (for example, S is equal to 5). When the quantity of data packets in the cache queue is greater than S, the terminal device may poll the cache queue to obtain S data packets. When the quantity of data packets in the cache queue is less than S, the terminal device may poll the cache queue to obtain all data packets.

Similarly, in some embodiments, when the terminal device performs polling on the cache queue, and the terminal device is uploading M data packets, the terminal device may poll the cache queue to obtain (S−M) data packets according to queue positions of the data packets in the cache queue, and then determine the (S−M) data packets as the to-be-uploaded data packet set. Accordingly, it may be ensured that a maximum quantity of data packets uploaded by the terminal device at the same time point is S, to prevent an uploading process of data packets from occupying too many network resources. M may be a positive integer less than or equal to S.

The terminal device may accumulate, in response to the first data packet in the to-be-uploaded data packet set failing to be uploaded, a quantity of consecutive uploading failures of the first data packet. The terminal device may determine, in response to the quantity of consecutive uploading failures reaching a count threshold, that the first data packet meets the continuous uploading failure condition. The terminal device may determine, in response to the quantity of consecutive uploading failures failing to reach the count threshold, that the first data packet does not meet the continuous uploading failure condition, and re-add the first data packet to the cache queue through a reporting component. A specific value of a count threshold is not limited in this embodiment. An example in which the count threshold is equal to 3 is used for description in this embodiment.

For example, a first data packet may be a data packet B. When uploading the data packet B for the first time, the terminal device may set a quantity of consecutive uploading failures of the data packet B to 0. In response to the data packet B failing to be uploaded, the terminal device may accumulate the quantity of consecutive uploading failures of the data packet B to 1. In this case, the quantity of consecutive uploading failures is less than the count threshold. The terminal device may re-add the data packet to the cache queue and wait for the next moment at which polling is performed on the cache queue. The terminal device may poll the cache queue to obtain the data packet B during the next polling, or may poll the cache queue to obtain the data packet B during the polling after the next polling or the next polling that (next-next-next). A time point at which the data packet B is obtained by performing polling is not limited in this embodiment. When performing polling on the cache queue again to obtain the data packet B, the terminal device may upload the data packet B for the second time. In response to the data packet B failing to be uploaded again, the terminal device may accumulate the quantity of consecutive uploading failures of the data packet B to 2, and rest is deduced by analogy. Until the accumulated quantity of consecutive uploading failures of data packet B is 3, the terminal device may determine that data packet B meets the continuous uploading failure condition.

Step S103: Add, in response to that a first data packet in the to-be-uploaded data packet set meets a continuous uploading failure condition, the first data packet to the database.

In step S103, "adding the first data packet to the database" means storing the first data packet in the database. In some embodiments, in step S101, when polling is performed on data packets in the database, to obtain a to-be-added data packet set, and each to-be-added data packet is deleted from the database, in step S103, the first data packet is written into the database. In some other embodiments, in step S101, when polling is performed on the data packets in the database, to obtain the to-be-added data packet set, and each to-be-added data packet is still kept in the database, in step S103, the first data packet may not be written into the database.

Specifically, the terminal device may obtain a data type of the first data packet in response to the first data packet in the to-be-uploaded data packet set meeting the continuous uploading failure condition. In response to the data type being a non-discardable type, a quantity of data packets in the database being less than a quantity threshold, and the first data packet not existing in the database, the terminal device may determine a current timestamp as a warehousing timestamp (a second warehousing timestamp) of the first data packet through a reporting component, send the first data packet and the second warehousing timestamp to a database thread, and associatively store the first data packet and the second warehousing timestamp in the database through the database thread.

The first data packet is obtained by performing packing processing on a plurality of pieces of service data, and a data type of the first data packet is determined by data types of the plurality of pieces of service data in the first data packet. It may be understood that the data types of the plurality of pieces of service data in the first data packet are the same. The terminal device may obtain the plurality of pieces of service data with the same data type, and then the plurality of pieces of service data with the same data type are packaged into the first data packet. Accordingly, the data types of the plurality of pieces of service data in the first data packet are all non-discardable types, or the data types of the plurality of pieces of service data in the first data packet are all discardable types. Therefore, the data types of the plurality of pieces of service data in the first data packet are all non-discardable types, and a data type of the first data packet is a non-discardable type; and the data types of the plurality of pieces of service data in the first data packet are all discardable types, and the data type of the first data packet is the discardable type.

In some embodiments, the data types of the plurality of pieces of service data in the first data packet may be different. The terminal device may obtain the plurality of pieces of service data with different data types, and then the plurality of pieces of service data with different data types are packaged into the first data packet. Accordingly, the data types of the plurality of pieces of service data in the first data packet are all non-discardable types, or the data types of the plurality of pieces of service data in the first data packet are all discardable types, or a data type of one part of the service data in the first data packet is a non-discardable type, and a data type of another part of the service data is a discardable type. Therefore, when the data types of the plurality of pieces of service data in the first data packet are all non-discardable types, a data type of the first data packet is a non-discardable type; when the data types of the plurality of pieces of service data in the first data packet are all discardable types, the data type of the first data packet is the discardable type; and when the first data packet simultaneously includes both the service data of the non-discardable type and the service data of the discardable type, a data type of the first data packet may be a discardable type.

The service data of the discardable type may represent unimportant service data uploaded by the terminal device, and the service data of the non-discardable type may represent important service data uploaded by the terminal device. In this embodiment, data loss may be reduced as much as possible. By setting the non-discardable type, reporting integrity of the important data may be ensured. By setting the discardable type, storage resources of the system may be balanced, thereby improving efficiency of uploading data packets.

A quantity threshold represents the maximum quantity of data packets that the database can accommodate. The quantity of data packets in the database is less than the quantity threshold, representing that there is an idle capacity in the database. If there is an idle capacity in the database, the terminal device may add the first data packet to the database through a reporting thread in the reporting component. It is to be understood that a specific value of the quantity threshold is not limited in this embodiment. For ease of understanding, an example in which the quantity threshold is equal to 5000 is used for description in this embodiment.

In some embodiments, the terminal device may delete the first data packet through the reporting component in response to the data type being the discardable type. The terminal device may delete the first data packet through the reporting thread in the reporting component. In this case, neither the database nor the cache queue includes the first data packet.

In some embodiments, in response to the data type being the non-discardable type, the quantity of data packets in the database being less than the quantity threshold, and the first data packet existing in the database, the terminal device may obtain an updated warehousing timestamp of the first data packet through the reporting component, send the first data packet and the updated warehousing timestamp to the database thread, and update the second warehousing timestamp of the first data packet in the database to the updated warehousing timestamp through the database thread. The updated warehousing timestamp may represent a timestamp at which the first data packet is re-written into the database. The terminal device may send the first data packet and the updated warehousing timestamp to the database thread through the reporting thread in the reporting component.

In some embodiments, in response to the data type being the non-discardable type and the quantity of data packets in the database being greater than or equal to the quantity threshold, the terminal device may delete the first data packet through the reporting component. In other words, in response to the quantity of data packets in the database being greater than or equal to the quantity threshold, the terminal device may delete the first data packet through the reporting thread in the reporting component.

Step S104: Delete, in response to a second data packet in the to-be-uploaded data packet set being successfully uploaded to a server, and the second data packet existing in the database, the second data packet from the database.

In some embodiments, the terminal device does not need to perform other steps in response to the second data packet in the to-be-uploaded data packet set being successfully uploaded to the server, and the second data packet not existing in the database. In this case, neither the database nor the cache queue includes the second data packet.

In response to the second data packet in the to-be-uploaded data packet set being successfully uploaded to an access layer (namely, an access server), the access layer may be configured to perform unpacking processing on the second data packet, and distribute service data that is obtained through unpacking to the server (namely, a data server). The access server may forward the service data in the second data packet to the same data server, or may forward the service data in the second data packet to different data servers.

The to-be-uploaded data packet set may further include other data packets in addition to the first data packet and the second data packet. For a process in which the terminal device uploads other data packets, refer to the description of the process of uploading the first data packet and the second data packet, which will not be described again herein.

When adding the first data packet to the database or updating the second warehousing timestamp of the first data packet in the database, the terminal device may poll the data packets in the database in subsequent steps, to obtain the first data packet by performing polling, and then the first data packet obtained by performing polling may be added to the cache queue. When polling is performed on the data packets in the cache queue in subsequent steps, the first data packet is obtained by performing polling, thereby implementing re-uploading of the first data packet.

By storing a to-be-uploaded data packet in the cache queue, the to-be-uploaded data packet in the to-be-uploaded data packet set may be directly read from the memory, to avoid reading data packets from a disk, thereby improving efficiency of uploading data packets. In addition, when uploading processing is performed on the data packets in the to-be-uploaded data packet set, uploading of the first data packet may be suspended in response to the first data packet in the to-be-uploaded data packet set meeting the continuous uploading failure condition, and the first data packet is then stored in the database, to avoid network resources from being repeatedly occupied when a network environment is not good. This may improve utilization of the network resources. When the network environment is improved subsequently, by re-performing polling on the database, there is still a chance to successfully upload the first data packet, thereby improving a success rate of uploading the data packet.

Figure 5:
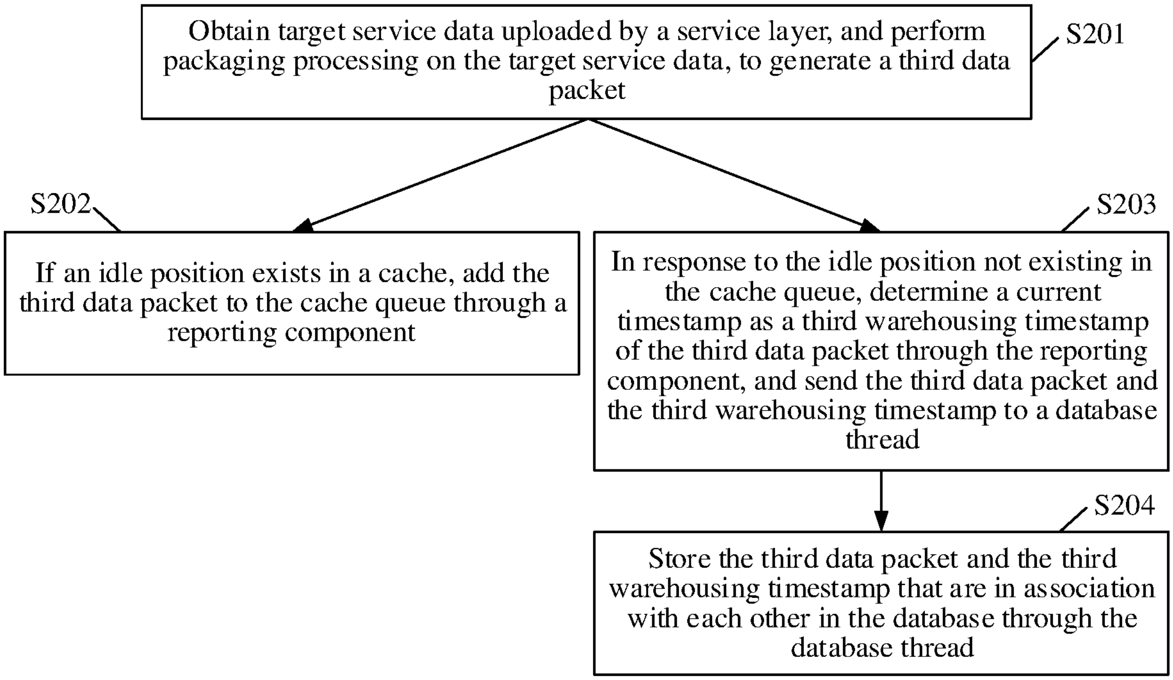
FIG. 5 is a schematic flowchart of a data processing method according to an embodiment of this application.

FIG. 5 is a schematic flowchart of a data processing method according to an embodiment of this application. The method may be performed by the server, or may be performed by the terminal device, or may be jointly performed by the server and the terminal device. The server may be server 20*a* in an embodiment corresponding to FIG. 2, and the terminal device may be a terminal device 20*b* in an embodiment corresponding to FIG. 2. In this embodiment, the method performed by the terminal device is used as an example for description. The data processing method may include step S201 to step S204.

Step S201: Obtain service data uploaded by a service layer, and perform packing processing on the service data, to generate a third data packet.

The terminal device may obtain, in a service thread, the service data uploaded by the service layer, and send the service data to a reporting component through the service thread. The terminal device may perform, in response to a data amount of the service data meeting a packing condition, packing processing on the service data based on the reporting component, to generate the third data packet.

In order not to affect operating performance of the system, the service reporting data is eventually forwarded to a dedicated reporting thread (namely, a reporting thread) through an inter-thread communication mechanism. In other words, different service data may be sent by different service threads at a service layer (namely, an application client) to a reporting thread in the reporting component. Further, in the reporting thread, if a data amount of the service data meets a packing condition, packing processing is performed on the service data. In some embodiments, if the data amount of the service data does not meet the packing condition, the terminal device may wait for a period, and then packing processing is performed on the service data after the data amount of the obtained service data meets the packing condition.

If the data amount of the service data reaches a data amount threshold, the terminal device may determine that the data amount of the service data meets the packing condition. In some embodiments, if the data amount of the service data does not reach the data amount threshold, the terminal device may determine that the data amount of the service data does not meet the packing condition.

The reporting component may provide background configuration capability. In other words, the reporting component may receive an implementation solution configured by a server (hereinafter referred to as a configuration server) corresponding to the reporting component, and perform a function of the reporting component according to the configured implementation solution. The server corresponding to the reporting component may refer to the server configured to manage, configure, and update the reporting component. The server may be a server set by a provider of the reporting component. For example, when the reporting component is a software platform running in an operating system, a corresponding server may be a cloud server provided by a provider of the software platform. The server may update the implementation solution configured in the reporting component at any time point or based on instructions sent by a user of the reporting component through other means (for example, through a reporting component management program in a smartphone). For example, an implementation solution of cloud configuration may be whether to report (to be specific, determine whether to perform the solution) a size of packing (namely, the data amount of the service data), a length of the cache queue (namely, a capacity of the cache queue), a capacity of the database, and the like. Accordingly, the implementation solution of the reporting component may be configured without updating the terminal device, the application, and the reporting component in this embodiment, thereby achieving the purpose of controlling a reporting process and avoiding accidents caused by the reporting the problem.

For example, the reporting component may receive the cache capacity configured by the configuration server, and determine whether an idle position exists in the cache queue by comparing a data amount of data packets in the cache queue with the cache capacity; and allow to write data into the cache queue in response to the data amount of the data packets in the cache queue being less than the cache capacity. refusing to write the data into the cache queue in response to the data amount of the data packets in the cache queue being not less than the cache capacity.

In another example, the reporting component may receive a database capacity configured by the configuration server, and determine whether an idle position exists in the database by comparing a data amount of data packets in the database with the database capacity; allow to write data into the database in response to the data amount of the data packets in the database being less than the database capacity; and refuse to write data into the database in response to the data amount of the data packets in the database being not less than the database capacity.

In another example, the reporting component may receive an uploading data amount configured by the configuration server. When performing polling on the cache queue, to obtain a to-be-uploaded data packet set, the reporting component may use the uploading data amount as a limiting condition, to obtain the to-be-uploaded data packet set. The data amount of the to-be-uploaded data packet set is not greater than the size of uploading data amount.

Packing refers to merging and compressing the service data. If the service data uploaded to the access server is not merged and compressed each time, network utilization is greatly reduced. Especially when a network in an in-vehicle environment is poor, merging and compressing the service data may not only improve network utilization, but also improve a success rate of uploading and timeliness of reporting.

The service data may be a device log associated with an application client in the terminal device. When the terminal device is an in-vehicle terminal, the device log may include a log record in the in-vehicle terminal. The log record may include a problem recorded when an in-vehicle client encounters functional abnormalities. In some embodiments, the log record may also include vehicle speed information and mileage information of the in-vehicle terminal during driving. In some embodiments, the log record may further include a driving trajectory of the in-vehicle terminal during driving. In some embodiments, the log record may further include driving video data collected by a driving recorder on the in-vehicle terminal. Data recorded in the log record is not listed one by one.

Correspondingly, the data server may be a server configured to perform data processing on the log record. For example, the data server may summarize problems related to functional abnormalities encountered by the in-vehicle client during use and provide solutions to the problems for the in-vehicle client. If the problems related to functional abnormalities cannot be uploaded to the data server in a timely and accurate manner, it would be difficult to obtain enough information to deal with the problem. If the problem is not handled in a timely manner, it will lead to user loss. In another example, the data server may analyze the vehicle speed information and the mileage information of the in-vehicle terminal, to determine whether a speeding behavior occurs in the in-vehicle terminal. When the speeding behavior occurs in the in-vehicle terminal, the data server prompts an overspeed warning for the in-vehicle terminal, to improve driving safety of the in-vehicle terminal. In another example, the data server may perform analysis on the driving trajectory of the in-vehicle terminal, and with reference to current traffic information on the road, implement an accurate and timely in-vehicle infotainment service or provide an autonomous driving service. The in-vehicle infotainment service may provide a function to avoid a congested road section. In another example, the data server may monitor operating status information of the vehicle in real time through driving video data collected by the driving recorder, so that the driving video data does not need to be copied from the in-vehicle terminal, thereby achieving the purpose of remote control and emergency command.

In this application, data related to a problem related to functional abnormalities, vehicle speed information, mileage information, a driving trajectory, and driving video data is involved in a device log. When the embodiments of this application are applied to specific products or technologies, user permission or consent needs to be obtained, and the collection, use, and processing of related data need to comply with related laws, regulations, and standards of related countries. For example, the vehicle terminal may display prompt information "Whether to record vehicle speed information and mileage information, and send the recorded information to a server". Only after corresponding user authorization of the in-vehicle terminal is received, the in-vehicle terminal may use the vehicle speed information and the mileage information as service data, and then upload the service data.

The terminal device may map a log file corresponding to a service layer to a virtual address space of a memory of the service layer. The terminal device may allocate a service identifier (also referred to as a target service identifier) to the service data in an incremental manner, and write the target service identifier into the log file. The terminal device may obtain a maximum service identifier and a minimum service identifier in a specific time period (also referred to as a target time period) through the virtual address space. The terminal device may obtain a quantity of deduplication service identifiers counted by the server in the target time period. The terminal device may generate a reporting success rate according to the maximum service identifier, the minimum service identifier, and the quantity of deduplication service identifiers. A monotonically increasing target service identifier may ensure accuracy of the generated reporting success rate.

The server may count the quantity of deduplication service identifiers received in the target time, and then return the quantity of deduplication service identifiers to the terminal device, so that the terminal device obtains the maximum service identifier and the minimum service identifier in the target time period from the virtual address space. Then, the terminal device may generate a reporting success rate based on the maximum service identifier, the minimum service identifier, and the quantity of deduplication service identifiers. In some embodiments, the terminal device may further send the maximum service identifier and the minimum service identifier obtained from the virtual address space in the target time period to the server, so that the server may count the quantity of deduplication service identifiers received in the target time period. Then, the server may generate the reporting success rate based on the maximum service identifier, the minimum service identifier, and the quantity of deduplication service identifiers.

The reporting success rate may be for one data server or for a plurality of data servers. In other words, the quantity of deduplication service identifiers may be counted for one data server or may be counted for the plurality of data servers. Accordingly, when the quantity of deduplication service identifiers is counted for one data server, the reporting success rate is for one data server. When the deduplication service identifier data is counted for all data servers, the reporting success rate is for all data servers. The reporting success rate for all the data servers may be equal to the reporting success rate for the access server. In other words, the deduplication service identifier data may be counted for the access server.

Due to various factors such as network instability, the data server inevitably receives duplicate target service identifiers. Accordingly, the data server needs to perform deduplication on the received target service identifiers, to obtain the deduplicated target service identifiers, and then use the quantity of deduplicated target service identifiers as the quantity of deduplicated service identifiers.

In this embodiment, the target service identifier may be saved to a file (namely, a log file) mapped by memory mapping (mmap, a method for a memory mapping file). The memory has a feature of being written back into a file system when a procedure crashes. This not only ensures that the target service identifier may continue to grow after the procedure is restarted, but also prevents the target service identifier from not being written into the file in time when an application crashes, causing the target service identifier to be non-monotonically continuous. In other words, the terminal device may map a log file of an application client in a disk into the virtual address space of the application client in the memory. The log file may be used for storing a target service identifier that is uniquely represented. When the procedure of the application client crashes, the terminal device releases the memory. The target service identifier in the file in the memory is written back into the disk, to ensure uniqueness of the target service identifier. Similarly, when the procedure does not crash, the target service identifier is also written back on the disk.

Different log files may be mapped to different application clients in the mmap method, so that each application client starts to increment from 0 to represent the target service identifier of the application client in the log file of the application client.

A specific process in which the terminal device generates a reporting success rate according to the maximum service identifier, the minimum service identifier, and the quantity of deduplication service identifiers, refer to the following formula (1):

$$\frac{count(distinct\ log\ id)}{(max(logid) - min(log\ id)) + 1} \tag{1}$$

log id may represent a target service identifier, distinct log id may represent deduplication performed on log id received by an access server in a target time period, count (distinct log id) may represent a total quantity (a quantity of deduplication service identifiers) of log id after deduplication; and max(log id) may represent a maximum target service identifier allocated in the target time period, min(log id) may represent a minimum target service identifier allocated in the target time period, and ((max(log id)−min(log id))+1) may represent a quantity of target service identifiers (namely, an accumulated quantity of service identifiers) generated in the target time period.

The terminal device may generate the accumulated quantity of service identifiers based on the maximum service identifier and the minimum service identifier, and then generate the reporting success rate based on a ratio of the quantity of deduplication service identifiers and the quantity of accumulated service identifiers.

The terminal device may determine whether an idle position exists in the device cache queue, and then perform step S202 when an idle position exists in the cache queue, or perform step S203 and step S204 when the idle position does not exist in the cache queue.

Step S202: Add the third data packet to the cache queue through a reporting component in response to an idle position existing in the cache queue.

In some embodiments, the terminal device may add the third data packet to the cache queue through a reporting thread.

The service data reported by the service layer is not immediately uploaded to an access layer, but is first stored in the cache queue. In a terminal environment (especially an in-vehicle environment), system resources are limited due to various reasons, and a network may enter an unstable state at any time, resulting in a low probability that data is successfully uploaded. Therefore, adding the packaged service data (namely, the third data packet) to the cache queue may save the data and retry after failure to improve a success rate of reporting data packets, and may reduce frequency of accessing a disk, thereby improving efficiency of uploading data packets.

It is to be understood that generally, the terminal device adds the data packets and the third data packet in the to-be-added data packet set to the end of the cache queue, to read the third data packet by performing polling on the cache queue subsequently. The terminal device may read the third data packet when performing polling on the cache queue subsequently for the first time, may also read the third data packet when performing polling on the cache queue subsequently for the second time, and may further read the third data packet by performing other polling subsequently. This is not limited to this application.

In some embodiments, the terminal device may further add the third data packet to other positions in the cache queue according to a packet priority of the third data packet. For example, a header position. Accordingly, the terminal device may read the third data packet in the cache queue when performing polling on the cache queue subsequently for the first time. It is to be understood that by setting the packet priority for the third data packet, polling may be first performed on data packets with a higher packet priority in the cache queue, and then data packets with a higher packet priority may be first uploaded. The packet priority may represent the importance of the data packet, thereby achieving the purpose of first uploading the data packets with higher importance.

Step S203: In response to no idle position existing in the cache queue, determine a current timestamp as a third warehousing timestamp of the third data packet through the reporting component, and send the third data packet and the third warehousing timestamp to a database thread.

Step S204: Associatively store the third data packet and the third warehousing timestamp in the database through the database thread.

Figure 6:
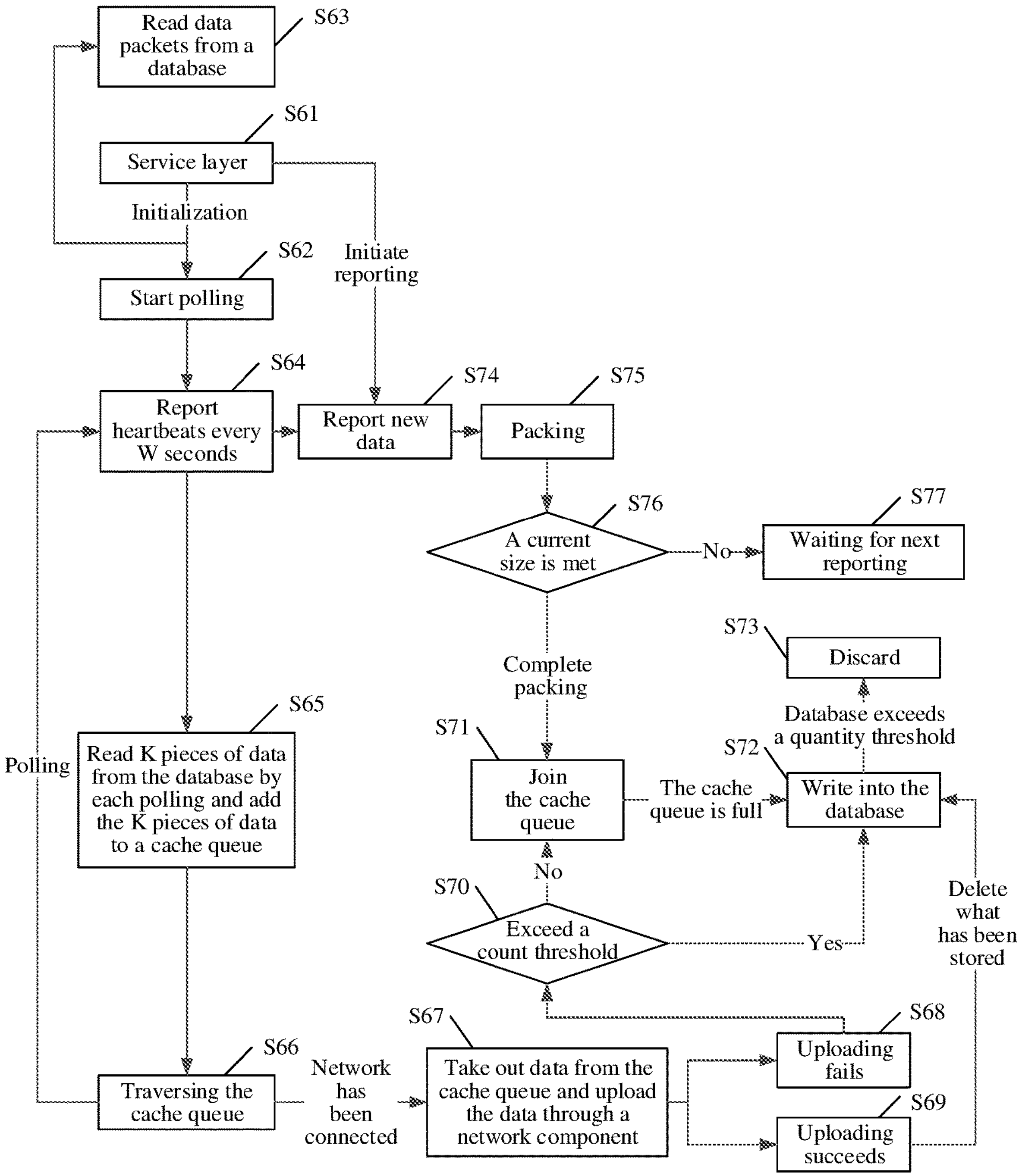
FIG. 6 is a schematic flowchart of performing data reporting according to an embodiment of this application.

FIG. 6 is a schematic flowchart of performing data reporting according to an embodiment of this application. As shown in FIG. 6, a service layer (namely, an application) may perform step S61, perform initialization through step S61, and then start polling through step S62. Polling may include two parts. One part is to poll a database and a cache queue, and the other part is to perform polling and send heartbeat service data every W seconds. The heartbeat service data refers to service data reported regularly, which may prove that a service end still operates normally and is used in a data background to analyze an operation status of the service end. A data type of the heartbeat service data may be a discardable type.

The time interval of polling in the first part may be Y seconds. Y may be a positive number, for example, five seconds. W may represent a time interval of polling in the second part. W may be a positive number, for example, 30 seconds.

As shown in FIG. 6, the terminal device may perform step S64, and send the heartbeat service data by performing polling every W second through step S64. As shown in FIG. 6, when performing polling on the database and the cache queue, the terminal device may first perform step S63. In step S63, the service data stored in the database is read, and then step S65 is performed. Through step S65, polling is performed on the service data stored in the database. Each polling may read K pieces of service data from the database, use the K pieces of service data as a to-be-added data packet set, and add the to-be-added data packet set to the cache queue. K may be a positive integer.

The terminal device may perform step S66, poll the cache queue through step S66, and obtain S data packets from the cache queue. The S data packets are used as a to-be-uploaded data packet set, and then under a condition of a network connection, uploading processing is performed on a to-be-uploaded data packet through step S67. In other words, uploading processing is performed on the data packets taken out from the cache queue through the network component, and the data packets taken out from the cache queue are uploaded to the access server. S may be a positive integer. S may be a quantity of data packets on which uploading processing is performed at the same time point set by the reporting component. By setting the quantity of data packets on which uploading processing is performed at the same time point, the network component may be prevented from occupying too many network resources.

As shown in FIG. 6, in step S68, in response to the data packets in the to-be-uploaded data packet set failing to be uploaded, the terminal device may accumulate the quantity of consecutive uploading failures for the data packets that fail to be uploaded. Then, it is determined whether the quantity of consecutive uploading failures exceeds a count threshold through step S70. When the quantity of consecutive uploading failures exceeds the count threshold, the terminal device may perform step S71, to write the data packets that fail to be uploaded into the database, read the data packets in subsequent polling, and try again. In some embodiments, when the quantity of consecutive uploading failures does not exceed the count threshold, the terminal device may perform step S71. The data packet that fails to be uploaded is re-added to the cache queue and tried again in subsequent polling.

Data types of data packets may be divided into two types: a discardable type and a non-discardable type. When performing step S71 and writing the data packets that fail to be uploaded into the database through step S71, the terminal device needs to determine the data type of the data packets. Further, when the data type of the data packets is a non-discardable type, the data packets that fail to be uploaded is written into the database through step S71. In some embodiments, when the data type of the data packets is the discardable type, the terminal device does not need to write the data packets that fail to be uploaded into the database through step S71, but directly discards the data packets that fail to be uploaded.

When performing step S72, the terminal device may determine whether the quantity of data packets in the database exceeds the quantity threshold, and then writes the data packets that fail to be uploaded into the database when a quantity of packets does not exceed the quantity threshold.

In some embodiments, when the quantity of packets exceeds the quantity threshold, the terminal device may perform step S73, to discard the data packets that fail to be uploaded.

When writing the data packets that fail to be uploaded into the database, the terminal device additionally updates one timestamp (to be specific, updates a warehousing timestamp), so that every time polling is performed on the database, a data packet with the longest timestamp is read from the database, added to the cache queue, and retried. In other words, the terminal device may poll the database through least recently used (LRU). In some embodiments, the terminal device may further poll the database through algorithms such as first input first output (FIFO), which is not limited in this application.

As shown in FIG. 6, in step S69, in response to the data packet in the to-be-uploaded data packet set being successfully uploaded, the terminal device may determine whether the successfully uploaded data packet exists in the database. Then, when the successfully uploaded data packet exists in the database, the successfully uploaded data packet is deleted from the database. In some embodiments, when the successfully uploaded data packet does not exist in the database, the terminal device does not need to perform other operations.

As shown in FIG. 6, when the service layer needs to report new data, the service layer may perform step S74, upload the new service data through step S74, and then perform packing processing on the service data through step S75. It is to be understood that the terminal device may determine whether the data amount (namely, a data size) of the service data meets a packing condition through step S76. Then, when the data size of the service data meets the packing condition, step S71 is performed. The data packet obtained by performing packing is added to the cache queue through step S71. In some embodiments, when the data size of the service data does not meet the packing condition, the terminal device may perform step S77, and wait for the service layer to upload new service data in step S77, until the data size of the received to-be-packaged service data meets the packing condition, and the packing is completed.

When adding the data packet obtained by performing packing into the cache queue through step S71, the terminal device needs to determine whether an idle position exists in the cache queue, and then when the idle position exists in the cache queue, the data packet obtained by performing packing is added to the cache queue. In some embodiments, when the idle position does not exist in the cache queue, the terminal device may perform step S72, and write the data packet obtained by performing packing into the database through step S72.

Similarly, when performing step S72, the terminal device may determine whether the quantity of data packets in the database exceeds the quantity threshold, and then writes the data packet obtained by performing packing into the database when the quantity of packets does not exceed the quantity threshold. In some embodiments, when the quantity of packets exceeds the quantity threshold, the terminal device may perform step S73, to discard the data packet obtained by performing packing.

When a cache queue in a dedicated reporting thread (namely, a reporting thread) is full, the reporting thread needs to directly forward the data packet to the dedicated database thread (namely, a database thread). When the reporting thread fails to report (to be specific, the quantity of consecutive uploading failures exceeds the count threshold), the reporting thread needs to indirectly forward the data packet to the database thread, so that the database thread performs step S72, to write the data packet into the database. Similarly, when reading data from the database during polling, the database thread needs to read the data packet from the database, and then forward the data packet to the reporting thread, so that the reporting thread performs step S71 and adds the data packet to the cache queue.

The terminal device may perform step S201 to step S204 at any moment. When step S202 is performed, the cache queue of the embodiment corresponding to FIG. 3 may include a third data packet. When performing polling on the cache queue, there is an opportunity to use the third data packet as a to-be-uploaded data packet set. When step S203 and step S204 are performed, the database of the embodiment corresponding to FIG. 3 may include the third data packet. When performing polling on the database, there is an opportunity to use the third data packet as a to-be-added data packet set.

In this embodiment, after obtaining to-be-uploaded service data, packing processing may be performed on the service data, and then the third data packet obtained by performing packing is added to the cache queue or the database. In a subsequent process of performing polling on the cache queue or the database, the third data packet is obtained by performing polling, to implement uploading of the service data on the third data packet. It is to be understood that by performing packing processing on the service data, network utilization may be improved, and a success rate of uploading data packets and timeliness of reporting data packets may be improved.

Figure 7:
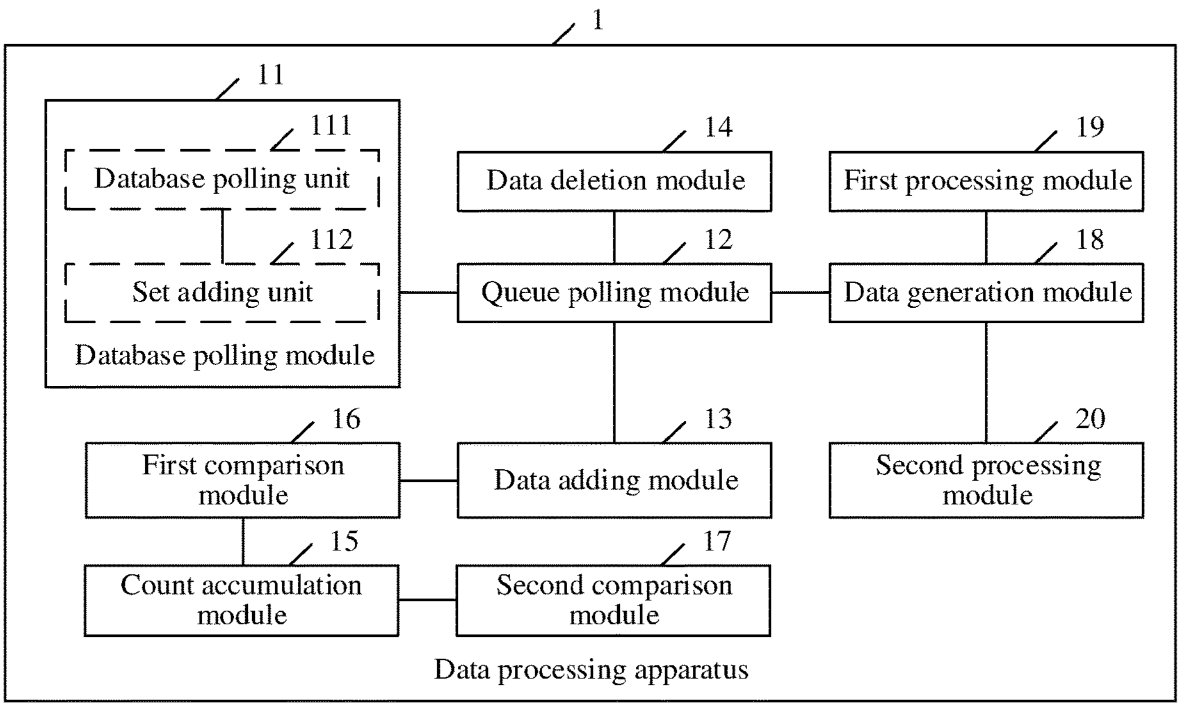
FIG. 7 is a schematic diagram of a structure of a data processing apparatus according to an embodiment of this application.

FIG. 7 is a schematic diagram of a structure of a data processing apparatus according to an embodiment of this application. The data processing apparatus 1 may include: a database polling module 11, a queue polling module 12, a data adding module 13, and a data deleting module 14. The data processing apparatus 1 may further include: a count accumulation module 15, a first comparison module 16, a second comparison module 17, a data generation module 18, a first processing module 19, and a second processing module 20.

The database polling module 11 is configured to poll data packets in the database, to obtain a to-be-added data packet set, and add the to-be-added data packet set to the cache queue; and the database polling module 11 includes: a database polling unit 111 and a set adding unit 112.

The database polling unit 111 is configured to invoke, in response to an idle position existing in the cache queue, a database thread through a reporting component to poll the data packets in the database, to obtain the to-be-added data packet set.

In some embodiments, the database polling unit 111 is configured to invoke, in response to the idle position existing in the cache queue, the database thread through the reporting component, and in the database thread, sort the data packets in the database according to first warehousing timestamps of the data packets in the database, to obtain sorted data packets.

In some embodiments, the database polling unit 111 is configured to poll the sorted data packets, to obtain K data packets, and determine the K data packets as the to-be-added data packet set, where K is a positive integer.

The set adding unit 112 is configured to send the to-be-added data packet set to the reporting component through the database thread, and add the to-be-added data packet set to the cache queue through the reporting component.

In one embodiment of the database polling unit 111 and the set adding unit 112, refer to the description about step S101 in the embodiment corresponding to FIG. 3, and details are not described herein again.

The queue polling module 12 is configured to poll the cache queue, to obtain a to-be-uploaded data packet set, and upload the to-be-uploaded data packet set.

In some embodiments, the queue polling module 12 is configured to perform, in response to data packets existing in the cache queue and according to queue positions of the data packets in the cache queue, polling on the cache queue, to obtain S data packets in a reporting component, and determine the S data packets as the to-be-uploaded data packet set. S is a positive integer.

In some embodiments, the queue polling module 12 is configured to upload the to-be-uploaded data packet set based on a network component.

The data adding module 13 is configured to add, in response to that a first data packet in the to-be-uploaded data packet set meets a continuous uploading failure condition, the first data packet to the database.

In some embodiments, the data adding module 13 is configured to obtain a data type of the first data packet in response to the first data packet in the to-be-uploaded data packet set meeting the continuous uploading failure condition.

In some embodiments, the data adding module 13 is configured to, in response to the data type being a non-discardable type, a quantity of data packets in the database being less than a quantity threshold, and the first data packet not existing in the database, determine a current timestamp as a second warehousing timestamp of the first data packet through a reporting component, send the first data packet and the second warehousing timestamp to a database thread, and associatively store the first data packet and the second warehousing timestamp in the database through the database thread.

In some embodiments, the data adding module 13 is further specifically configured to delete the first data packet through the reporting component in response to the data type being a discardable type.

In some embodiments, the data adding module 13 is further configured to, in response to the data type being the non-discardable type, the quantity of data packets in the database being less than the quantity threshold, and the first data packet existing in the database, obtain an updated warehousing timestamp of the first data packet through the reporting component, send the first data packet and the updated warehousing timestamp to the database thread, and update the second warehousing timestamp of the first data packet in the database to the updated warehousing timestamp through the database thread.

In some embodiments, the data adding module 13 is further configured to delete the first data packet through the reporting component in response to the data type being the non-discardable type and the quantity of data packets in the database being greater than or equal to the quantity threshold.

The data deleting module 14 is configured to delete, in response to a second data packet in the to-be-uploaded data packet set being successfully uploaded to a server, and the second data packet existing in the database, the second data packet from the database.

In some embodiments, the count accumulation module 15 is configured to accumulate, in response to the first data packet in the to-be-uploaded data packet set failing to be uploaded, a quantity of consecutive uploading failures of the first data packet;

the first comparison module 16 is configured to determine, in response to the quantity of consecutive uploading failures reaching a count threshold, that the first data packet meets the continuous uploading failure condition; and the second comparison module 17 is configured to determine, in response to the quantity of consecutive uploading failures failing to reach the count threshold, that the first data packet does not meet the continuous uploading failure condition, and re-add the first data packet to the cache queue through a reporting component.

In some embodiments, the data generation module 18 is configured to obtain service data uploaded by a service layer, and perform packing processing on the service data, to generate a third data packet.

In some embodiments, the data generation module 18 is configured to obtain, in a service thread, the service data uploaded by the service layer, and send the service data to the reporting component through the service thread.

In some embodiments, the data generation module 18 is configured to perform, in response to a data amount of the service data meeting a packing condition, packing processing on the service data based on the reporting component, to generate the third data packet.

The first processing module 19 is configured to add the third data packet to the cache queue through a reporting component in response to an idle position existing in the cache queue.

In some embodiments, the second processing module 20 is configured to, in response to no idle position existing in the cache queue, determine a current timestamp as a third warehousing timestamp of the third data packet through the reporting component, and send the third data packet and the third warehousing timestamp to a database thread.

The second processing module 20 is configured to associatively store the third data packet and the third warehousing timestamp in the database through the database thread.

In some embodiments, the data processing apparatus 1 is further configured to map a log file corresponding to the service layer to a virtual address space of a memory of the service layer.

In some embodiments, the data processing apparatus 1 is further configured to allocate a target service identifier to the service data in an incremental manner, and write the target service identifier into the log file.

In some embodiments, the data processing apparatus 1 is further configured to obtain a maximum service identifier and a minimum service identifier in a target time period through the virtual address space.

In some embodiments, the data processing apparatus 1 is further configured to obtain a quantity of deduplication service identifiers counted by the server in the target time period.

In some embodiments, the data processing apparatus 1 is further configured to generate a reporting success rate according to the maximum service identifier, the minimum service identifier, and the quantity of deduplication service identifiers.

In some embodiments, the data processing apparatus 1 is further configured to, in response to the second data packet in the to-be-uploaded data packet set being successfully uploaded to an access layer, perform unpacking processing on the second data packet, and distributing service data that is obtained through unpacking to the server.

Embodiments of database polling module 11, queue polling module 12, data adding module 13, and data deleting module 14, can be referenced in the description about step S101 to step S104 in the embodiment corresponding to FIG. 3, and details are not described herein again. In one embodiment of the count accumulation module 15, the first comparison module 16, the second comparison module 17, the data generation module 18, the first processing module 19, and the second processing module 20, refer to step S201 to step S204 in the embodiment corresponding to FIG. 5, and details are not described herein again. In addition, the description of beneficial effects of the same method is not described herein again.

In some embodiments, the data processing apparatus 1 may further include a configuration receiving module, configured to receive configuration information of a configuration server, where the configuration information includes one of the following:

a cache capacity, used for specifying a maximum value of a data amount allowed to be written into the cache queue;

a database capacity, used for specifying a maximum value of a data amount allowed to be written into the database; and an uploading data amount, used for specifying a maximum data amount of data packets that are simultaneously uploaded.

the data processing apparatus 1 may determine whether an idle position exists in the cache queue by comparing a data amount of data packets in the cache queue with the cache capacity; allow to write data into the cache queue in response to the data amount of the data packets in the cache queue being less than the cache capacity; and refuse to write the data into the cache queue in response to the data amount of the data packets in the cache queue being not less than the cache capacity.

The data processing apparatus 1 may determine whether an idle position exists in the database by comparing a data amount of data packets in the database with the database capacity; allow to write data into the database in response to the data amount of the data packets in the database being less than the database capacity; and refuse to write data into the database in response to the data amount of the data packets in the database being not less than the database capacity.

When the queue polling module 12 performs polling on the cache queue to obtain the to-be-uploaded data packet set, the queue polling module 12 may use the uploading data amount as a limiting condition, to obtain the to-be-uploaded data packet set. The data amount of the to-be-uploaded data packet set is not greater than the size of the uploading data amount.

Figure 8:
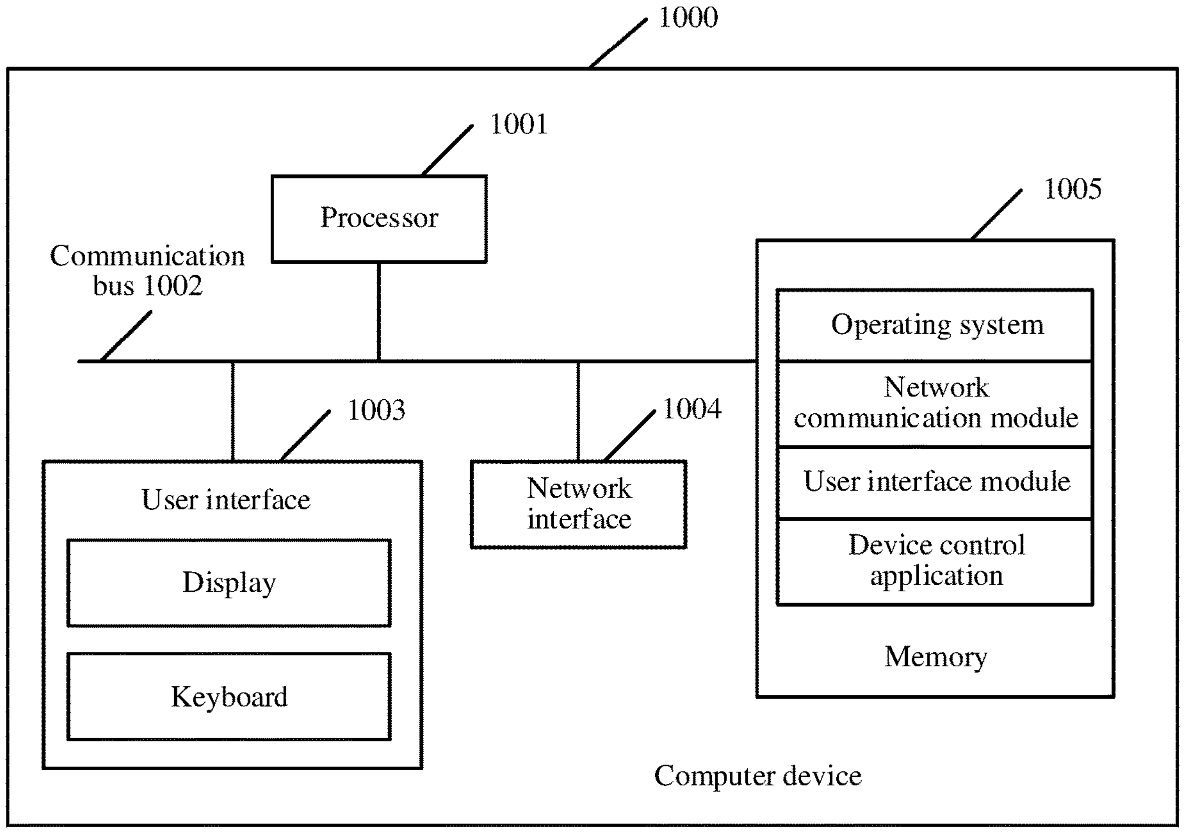
FIG. 8 is a schematic diagram of the structure of a computer device according to an embodiment of this application.

FIG. 8 is a schematic diagram of the structure of a computer device according to an embodiment of this application. As shown in FIG. 8, computer device 1000 may include: a processor 1001, a network interface 1004, and a memory 1005. In addition, the computer device 1000 may further include: a user interface 1003 and at least one communication bus 1002. The communication bus 1002 is configured to implement connection and communication between the components. In some embodiments, the user interface 1003 may include a display and a keyboard. Optionally, the user interface 1003 may further include a standard wired interface and a wireless interface. In some embodiments, the network interface 1004 may include a standard wired interface and a standard wireless interface (such as a Wi-Fi interface). Memory 1005 may be high-speed RAM, or may be a non-volatile memory, for example, at least one magnetic disk memory. In some embodiments, memory 1005 may alternatively be at least one storage apparatus located away from the processor 1001. As shown in FIG. 8, the memory 1005 used as a computer-readable storage medium may include an operating system, a network communication module, a user interface module, and a device-control application.

In computer device 1000 shown in FIG. 8, the network interface 1004 may provide a network communication function; the user interface 1003 is mainly configured to provide an input interface for the user; and the processor 1001 may be configured to invoke a device control application stored in the memory 1005, to implement the following operations:

performing polling on data packets in the database, to obtain a to-be-added data packet set, and adding the to-be-added data packet set to the cache queue;

performing polling on the cache queue, to obtain a to-be-uploaded data packet set, and uploading the to-be-uploaded data packet set;

adding, in response to that a first data packet in the to-be-uploaded data packet set meets a continuous uploading failure condition, the first data packet to the database;

deleting, in response to a second data packet in the to-be-uploaded data packet set being successfully uploaded to a server, and the second data packet existing in the database, the second data packet from the database.

It is to be understood that the computer device 1000 described in this embodiment may implement the descriptions of the data processing method in the embodiments corresponding to FIG. 3 and FIG. 5, or may also implement the descriptions of the data processing apparatus 1 in the embodiment corresponding to FIG. 7. Details are not described herein again. In addition, the description of beneficial effects of the same method is not described herein again.

In addition, this embodiment further provides a computer-readable storage medium. The computer-readable storage medium stores a computer program executed by the data processing apparatus 1 mentioned above, and the computer program includes program instructions. When executing the program instructions, the processor can perform the descriptions of the data processing method in the embodiments corresponding to FIG. 3 and FIG. 5. Therefore, details are not described herein again. In addition, the description of beneficial effects of the same method is not described herein again. For technical details that are not disclosed in the embodiments of the computer-readable storage medium of this application, refer to the method embodiments of this application.

In addition, the embodiments of this application further provide a computer program product or a computer program. The computer program product or the computer program may include computer instructions, the computer instructions may be stored in a computer-readable storage medium. A processor of a computer device reads the computer instructions from the computer-readable storage medium and may execute the computer instructions to enable the computer device to perform the description of the data processing method in the foregoing embodiments corresponding to FIG. 3 and FIG. 5, and therefore, details are not repeated herein. In addition, the description of beneficial effects of the same method is not described herein again. For technical details that are not disclosed in the computer program product or computer program embodiments involved in this application, reference may be made to the descriptions of the method embodiments of this application.

A person skilled in the art may understand that all or some of the procedures of the methods of the foregoing embodiments may be implemented by a computer program instructing relevant hardware. The computer program may be stored in a computer-readable storage medium. When the program is executed, the procedures of the foregoing method embodiments may be implemented. The storage medium may be a magnetic disk, an optical disc, a read-only memory (ROM), a random-access memory (RAM), or the like.

The technical features in the foregoing embodiments may be randomly combined. For concise description, not all possible combinations of the technical features in the embodiment are described. However, provided that combinations of the technical features do not conflict with each other, the combinations of the technical features are considered as falling within the scope recorded in this specification.

What are disclosed above are merely examples of embodiments of this application, and certainly are not intended to limit the protection scope of this application. Therefore, equivalent variations made in accordance with the claims of this application shall fall within the scope of this application.

What is claimed is:

1. A data processing method, applied to an in-vehicle central control device, a database and a cache queue being arranged in the in-vehicle central control device, and the method comprising:

polling data packets in the database to obtain a to-be-added data packet set and adding the to-be added data packet set to the cache queue;

polling the cache queue to obtain a to-be-uploaded data packet set and uploading the to-be-uploaded data packet set through a wireless communication connection of the in-vehicle central control device;

storing a first data packet in the database in response to the first data packet in the to-be-uploaded data packet set meeting a continuous uploading failure condition;

generating, based on service data, a third data packet to be added to the cache queue; and in response to no idle position existing in the cache queue for the third data packet, determining a current timestamp as a target warehousing timestamp of the third data packet, sending the third data packet and the target warehousing timestamp to a database thread, and associatively storing the third data packet and the target warehousing timestamp in the database through the database thread.

2. The method according to claim 1, further comprising:

receiving a cache capacity configured by a configuration server;

determining whether an idle position exists in the cache queue by comparing a size of data packets in the cache queue with the cache capacity;

allowing writing data into the cache queue in response to the size of the data packets in the cache queue being less than the cache capacity.

3. The method according to claim 1, further comprising:

receiving a database capacity configured by a configuration server;

determining whether an idle position exists in the database by comparing a size of data packets in the database with the database capacity;

allowing writing data into the database in response to the size of the data packets in the database being less than the database capacity.

4. The method according to claim 1, further comprising:

receiving an uploading size configured by a configuration server, wherein the polling the cache queue to obtain a to-be-uploaded data packet set comprises:

using the uploading size as a limiting condition to obtain the to-be-uploaded data packet set, wherein a size of the to-be-uploaded data packet set is not greater than the uploading size.

5. The method according to claim 1, wherein the polling data packets in the database to obtain a to-be-added data packet set and adding the to-be-added data packet set to the cache queue comprises:

invoking a database thread through a reporting component to poll the data packets in the database in response to an idle position existing in the cache queue to obtain the to-be-added data packet set; and sending the to-be-added data packet set to the reporting component through the database thread and adding the to-be-added data packet set to the cache queue through the reporting component.

6. The method according to claim 5, wherein the invoking, in response to an idle position existing in the cache queue, a database thread through a reporting component to poll on the data packets in the database, to obtain the to-be-added data packet set comprises:

invoking the database thread through the reporting component in response to the idle position existing in the cache queue, and in the database thread, sorting the data packets in the database according to first warehousing timestamps of the data packets in the database to obtain sorted data packets; and polling the sorted data packets to obtain K data packets and determining the K data packets as the to-be-added data packet set, wherein K is a positive integer.

7. The method according to claim 1, wherein the polling the cache queue to obtain a to-be-uploaded data packet set and uploading the to-be-uploaded data packet set comprises:

polling the cache queue to obtain S data packets in a reporting component in response to data packets existing in the cache queue and according to queue positions of the data packets in the cache queue and determining the S data packets as the to-be-uploaded data packet set, wherein S is a positive integer; and uploading the to-be-uploaded data packet set based on a network component.

8. The method according to claim 1, further comprising:

accumulating a quantity of consecutive uploading failures of the first data packet in response to the first data packet in the to-be-uploaded data packet set failing to be uploaded;

determining that the first data packet meets the continuous uploading failure condition in response to the quantity of consecutive uploading failures reaching a count threshold; and determining that the first data packet does not meet the continuous uploading failure condition in response to the quantity of consecutive uploading failures not reaching the count threshold and re-adding the first data packet to the cache queue through a reporting component.

9. The method according to claim 1, wherein the adding, in response to a first data packet in the to-be-uploaded data packet set meeting a continuous uploading failure condition, the first data packet to the database comprises:

obtaining a data type of the first data packet in response to the first data packet in the to-be-uploaded data packet set meeting the continuous uploading failure condition; and in response to the data type being a non-discardable type, a quantity of data packets in the database being less than a quantity threshold, and the first data packet not existing in the database, determining a current timestamp as a current warehousing timestamp of the first data packet through a reporting component, sending the first data packet and the current warehousing timestamp to a database thread, and associatively storing the first data packet and the current warehousing timestamp in the database through the database thread.

10. The method according to claim 9, further comprising:

deleting the first data packet through the reporting component in response to the data type being a discardable type;

in response to the data type being the non-discardable type, the quantity of data packets in the database being less than the quantity threshold, and the first data packet existing in the database, obtaining an updated warehousing timestamp of the first data packet through the reporting component, sending the first data packet and the updated warehousing timestamp to the database thread, and updating the second warehousing timestamp of the first data packet in the database to the updated warehousing timestamp through the database thread; and deleting the first data packet through the reporting component in response to the data type being the non-discardable type and the quantity of data packets in the database being greater than or equal to the quantity threshold.

11. The method according to claim 1, further comprising:

adding the third data packet to the cache queue through a reporting component in response to an idle position existing in the cache queue.

12. The method according to claim 11, wherein the generating third packet comprises:

obtaining the service data uploaded by a service layer in a service thread and sending the service data to a reporting component through the service thread; and packing the service data based on the reporting component to generate the third data packet in response to a data amount of the service data meeting a packing condition.

13. The method according to claim 1, further comprising:

mapping a log file corresponding to a service layer to a virtual address space of a memory of the service layer;

allocating a target service identifier to the service data in an incremental manner and writing the target service identifier into the log file;

obtaining a maximum service identifier and a minimum service identifier in a target time period through the virtual address space;

obtaining a quantity of deduplication service identifiers counted by the server in the target time period; and generating a reporting success rate according to the maximum service identifier, the minimum service identifier, and the quantity of deduplication service identifiers.

14. The method according to claim 1, further comprising:

in response to the second data packet in the to-be-uploaded data packet set being successfully uploaded to an access layer, unpacking the second data packet by the access layer and distributing service data that is obtained through unpacking to the server.

15. A data processing apparatus arranged in an in-vehicle central control device, a database and a cache queue being arranged in the in-vehicle central control device, and the apparatus comprising at least one memory and at least one processor coupled to the memory, the at least one processor being configured to:

poll data packets in the database to obtain a to-be-added data packet set and add the to-be-added data packet set to the cache queue;

poll the cache queue to obtain a to-be-uploaded data packet set and upload the to-be-uploaded data packet set through a wireless communication connection of the in-vehicle central control device;

add a first data packet to the database in response to the first data packet in the to-be-uploaded data packet set meeting a continuous uploading failure condition;

delete a second data packet from the database in response to the second data packet in the to-be-uploaded data packet set being successfully uploaded to a server;

generate, based on service data, a third data packet to be added to the cache queue; and in response to no idle position existing in the cache queue for the third data packet, determine a current timestamp as a target warehousing timestamp of the third data packet, sending the third data packet and the target warehousing timestamp to a database thread, and associatively store the third data packet and the target warehousing timestamp in the database through the database thread.

16. The data processing apparatus according to claim 15, wherein the at least one processor is further configured to:

receive configuration information of a configuration server, wherein the configuration information comprises one of the following:

a cache capacity indicating a maximum size allowed to be written into the cache queue;

a database capacity indicating a maximum size allowed to be written into the database; and an uploading data amount indicating a maximum size of data packets that are simultaneously uploaded.

17. A non-transitory computer-readable storage medium storing a computer program executable by a processor of an in-vehicle central control device to perform:

polling data packets in a database arranged in the in-vehicle central control device to obtain a to-be-added data packet set and adding the to-be-added data packet set to a cache queue arranged in the in-vehicle central control device;

polling the cache queue to obtain a to-be-uploaded data packet set and uploading the to-be-uploaded data packet set through a wireless communication connection of the in-vehicle central control device;

storing a first data packet in the database in response to the first data packet in the to-be-uploaded data packet set meeting a continuous uploading failure condition;

deleting a second data packet from the database in response to the second data packet in the to-be-uploaded data packet set being successfully uploaded to a server;

generating, based on service data, a third data packet to be added to the cache queue; and in response to no idle position existing in the cache queue for the third data packet, determining a current timestamp as a target warehousing timestamp of the third data packet, sending the third data packet and the target warehousing timestamp to a database thread, and associatively storing the third data packet and the target warehousing timestamp in the database through the database thread.

18. The non-transitory computer-readable storage medium according to claim 17, wherein the computer program further causes the processor to perform:

receiving a cache capacity configured by a configuration server;

determining whether an idle position exists in the cache queue by comparing a size of data packets in the cache queue with the cache capacity;

allowing writing data into the cache queue in response to the size of the data packets in the cache queue being less than the cache capacity.

19. The non-transitory computer-readable storage medium according to claim 18, wherein the computer program further causes the processor to perform:

receiving a database capacity configured by a configuration server;

determining whether an idle position exists in the database by comparing a size of data packets in the database with the database capacity;

allowing writing data into the database in response to the data amount of the data packets in the database being less than the database capacity.

* * * * *